United States Patent [19]

Kim

[11] Patent Number: 4,623,787

[45] Date of Patent: Nov. 18, 1986

[54] BALL AND TRANSDUCER MOUNTING ARRANGEMENT FOR MOUSE

[75] Inventor: Syng N. Kim, Hoffman Estates, Ill.

[73] Assignee: Wico Corporation, Niles, Ill.

[21] Appl. No.: 557,889

[22] Filed: Dec. 5, 1983

[51] Int. Cl.[4] ............................................. G01V 9/04
[52] U.S. Cl. ............................. 250/221; 250/231 SE; 250/239
[58] Field of Search ............. 250/231 SE, 231 R, 221, 250/239; 74/471 R, 471 XY; 33/1 M

[56] References Cited

U.S. PATENT DOCUMENTS

| | | | |
|---|---|---|---|
| 3,304,434 | 2/1967 | Koster | 250/231 SE |
| 3,541,541 | 11/1970 | Engelbart | 340/324 |
| 3,835,464 | 9/1974 | Rider | 340/324 |
| 3,892,963 | 7/1975 | Hawley et al. | 250/231 R |
| 3,987,685 | 10/1976 | Opocensky | 74/471 XY |
| 4,022,969 | 5/1977 | McKinlay et al. | 178/18 |
| 4,364,035 | 12/1982 | Kirsch | 340/710 |
| 4,369,439 | 1/1983 | Broos | 340/710 |
| 4,562,347 | 12/1985 | Hovey et al. | 250/231 SE |

OTHER PUBLICATIONS

"Meet the Mouse", *Popular Computing*, Mar. 1983, pp. 102–105.

"Vision, A Mouse on the Digital Desktop", *PC Magazine*, Feb. 1983, pp. 74–79.

"The Tail of the Mouse", *PC Magazine*, Feb. 1983, pp. 66–71.

*Primary Examiner*—David C. Nelms
*Assistant Examiner*—James G. Gatto
*Attorney, Agent, or Firm*—Emrich & Dithmar

[57] ABSTRACT

A "mouse"-type position indicating control apparatus has a two-part housing comprising an apertured base and a cover which contains a ball, a portion of which projects through the aperture in the base to support and transport the housing along a support surface. A one-piece molded mounting block rests on the base for holding the ball in position over the aperture while accommodating universal rotation thereof. Code wheel shafts have the opposite ends thereof journaled in bearing grooves in the support block for frictional engagement with the ball for indicating orthogonal components of rotation. Photoelectric transducer elements are mounted on the mounting block. A cap plate covers the mounting block and retains the shafts and photoelectric elements in place. Retaining members on the cover engage the plate for clamping the mounting block against the base. The apparatus is assembled without the use of fasteners or tools except for securing the base to the cover.

18 Claims, 11 Drawing Figures

BALL AND TRANSDUCER MOUNTING ARRANGEMENT FOR MOUSE

BACKGROUND OF THE INVENTION

The present invention relates to a position indicating control apparatus, and particularly to such apparatus of the type which is commonly referred to as a "mouse".

A mouse is a pointing device, typically for use with visual display systems in which a transducer converts translational motion of a housing into a position signal for controlling movement of a cursor associated with a visual display system. The mouse moves over a passive surface, such as a sheet of paper on a desk top, this two-dimensional motion corresponding directly with the two-dimensional motion of a cursor in a graphic display.

Electronic mice are of fundamentally two types viz., mechanical and optical. A mechanical mouse comprises one or more rotatable elements which frictionally engage the underlying paper or support surface. The components of rotation of these rotating elements along two orthogonal axes are sensed by transducers which generate electrical signals indicative of the motion. An optical mouse has no moving parts. It moves over an array of indicia on a special pad. A lamp in the mouse illuminates the indicia, the reflected image being sensed by a transducer which generates position-indicating electrical signals.

The present invention relates to an improved form of mechanical mouse, and particularly to the type of mechanical mouse which utilizes a universally rotatable ball as the rotatable element. Typically, the ball sits in an aperture in the base of the mouse housing, so that a portion of the ball projects through the aperture for frictional engagement with the underlying support surface. Such a mouse is disclosed, for example, in U.S. Pat. Nos. 3,987,685 and 3,835,464. In such prior mechanical mice, a plurality of rotatable members frictionally engage the ball at points around its equator and adjacent to its top for cooperation with the base to hold the ball in position over the aperture. At least two of these rotatable members serve as sensors to detect the components of rotation of the ball. The prior devices have typically required complex mounting structure to mount these multiple rotating members. In those cases, such as in U.S. Pat. No. 3,987,685, where the rotating members include elongated shafts, expensive bearings have been provided for the shafts. These prior mouse assemblies are quite expensive, both because of the large number of expensive parts which are used, and because of the time and labor-consuming assembly required.

SUMMARY OF THE INVENTION

It is a general object of the present invention to provide an improved mechanical mouse which avoids the disadvantages of prior mice while affording additional structural and operating advantages.

An important object of this invention is the provision of a "mouse"-type position indicating control apparatus, which utilizes a minimal number of parts.

It is another object of this invention to provide a position indicating control apparatus of the type set forth, which is characterized by simple and economical construction.

In connection with the foregoing objects, it is another object of this invention to provide a position indicating control apparatus of the type set forth, wherein the ball and associated transducer assemblies are mounted in place by parts which can be assembled substantially without the use of tools.

These and other objects of the invention are attained by providing position indicating control apparatus for electronically representing position and movement along a support surface, the apparatus comprising: a housing having an apertured base member, spherical means for supporting the housing on the support surface and transporting the housing over the support surface, frame means disposed within the housing and cooperating with the base for loosely encompassing the spherical means and constraining it in a mounted condition in the housing, the spherical means in its mounted condition being universally rotatable and having a portion thereof extending through the aperture in the base member so that contact between the spherical means and the support surface provides rotation of the spherical means indicative of movement of the housing with respect to the support surface, and transducer means coupled to the spherical means and responsive to rotation thereof for producing electrical signals indicative of the movement and position of the housing.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
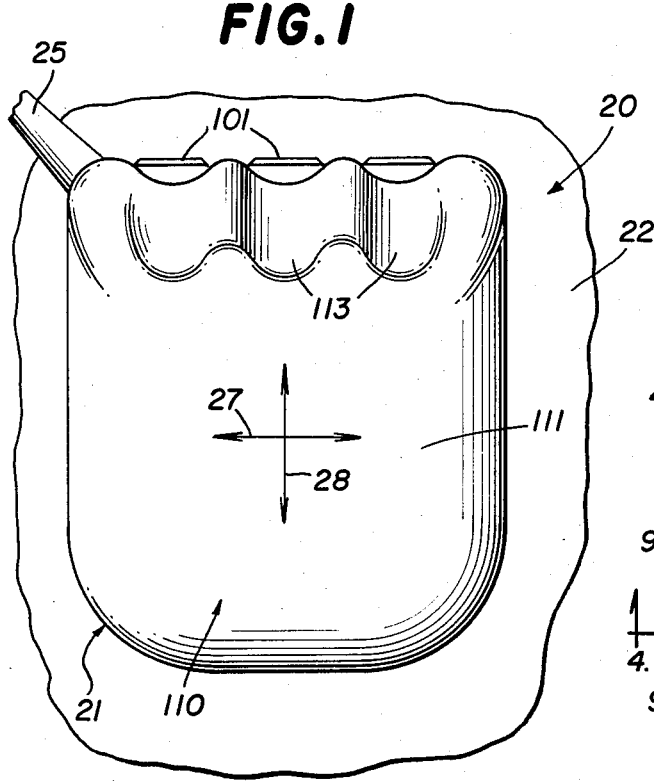
FIG. 1 is a top plan view of a position indicating apparatus or mouse, constructed in accordance with and embodying the features of the present invention, shown in its use position on an associated support surface.
Figure 5:
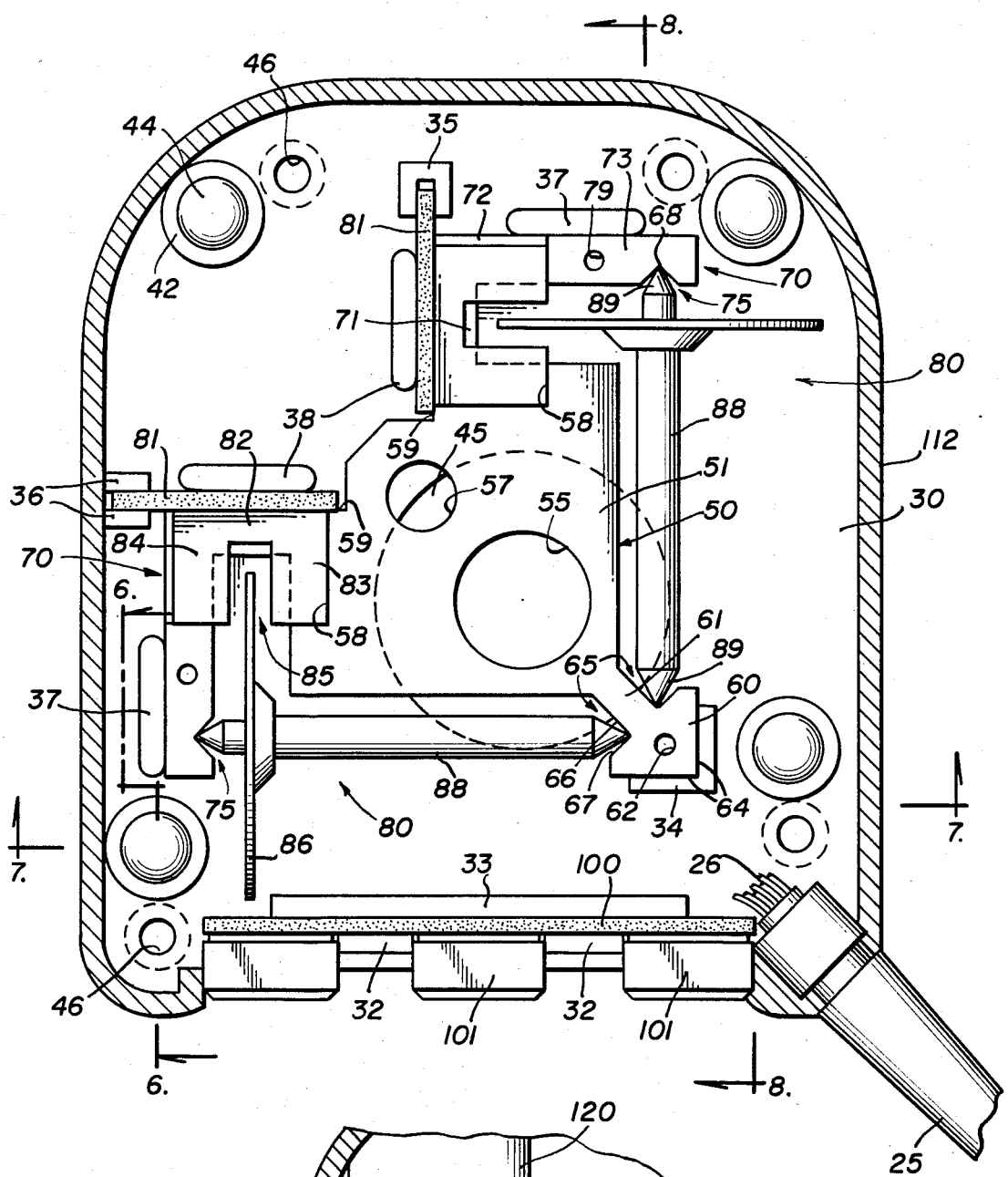
FIG. 5 is an enlarged view similar to FIG. 2, but with the cover shown in horizontal section.

Referring to FIG. 1, there is illustrated a position indicating control apparatus of the type commonly referred to as a "mouse", generally designated by the numeral 20 and constructed in accordance with and embodying the features of the present invention. The mouse 20 includes a housing 21 adapted for riding over an underlying support surface 22 for generating electrical control signals which are transmitted over a control cable 25, comprising a plurality of wires 26, (see FIG. 5) to an associated electronic device, such as a visual display. The mouse 20 generates signals indicative of its position along orthogonal axes indicated by the arrows 27 and 28, which are substantially parallel to the support surface 22 in use. Thus, the movement of a cursor over the display on a cathode ray tube, for example, may be controlled by effecting corresponding movements of the mouse 20 over the support surface 22, all in a known manner.

Referring now also to FIGS. 2-7, the housing 21 includes a flat, generally rectangular base 30 which is of unitary one-piece construction, preferably being molded of a suitable plastic material such as acrilonitrile butadiene styrene (ABS). The base 30 has three arcuate spaced-apart finger rests 31 formed along the forward edge thereof. Integral with the base 30 and projecting upwardly therefrom between the finger rests 31 are two upstanding lugs 32. Spaced a slight distance behind the lugs 32 is an elongated upstanding retaining bar 33. Also upstanding from the base 30 are a right angle lug 34, a generally U-shaped lug 35 and a pair of short parallel lugs 36. Also provided on the base 30 are two upstanding positioning flanges 37 and two upstanding retaining flanges 38.

Formed through the base 30 is a circular ball hole 40 having a downwardly and inwardly beveled upper surface 41. Also formed on the base 30, respectively adjacent to the four corners thereof, are four cylindrical bushings 42 defining complementary holes through the base 30. Each of the bushings 42 is provided at its lower end with a radially inturned lip 43 (see FIGS. 6 & 7). Each of the bushings 42 receives therein an associated ball 44 which is seated on the inturned lip 43 with a portion thereof projecting downwardly below the bottom of the base 30 for rolling engagement with the underlying support surface 22. Disposed in the ball hole 40 is a control ball 45, being seated on the beveled surface 41 with a portion thereof projecting beneath the base 30 for rolling engagement with the underlying support surface 22. Also formed through the base 30, respectively adjacent to the bushings 42, are four mounting apertures 46. Three short positioning pins 47 project upwardly a slight distance from the base 30, respectively adjacent to the angle lug 34 and the positioning flanges 37.

Referring now in particular to FIGS. 4, 5, 7-9 and 11, there is provided a mounting block, generally designated by the numeral 50, which is mounted on the base 30 for retaining the control ball 45 in place. The mounting block 50 is preferably of unitary one-piece construction, and may be molded of a suitable self-lubricating plastic material such as an acetyl resin of the type sold by E. I. DuPont de Nemours & Co. Inc. under the Trademark "DELRIN". The mounting block 50 has a main body 51 which is generally cubical in shape, having a ball-receiving recess 52 (FIGS. 4 and 7) formed at one corner thereof, the recess 52 opening at the bottom and two adjacent sides of the main body 51. The recess 52 has a part-cylindrical lower portion 53 and a part-spherical upper portion 54 which communicates with a circular hole 55 in the top of the mounting block 50. A plurality of equiangularly spaced-apart elongated bearing ribs 56 (see FIGS. 9 and 11) project radially inwardly of the part-cylindrical portion 53 of the ball-receiving recess 52 for bearing engagement with the control ball 45, as will be explained more fully below. Formed in the top of the mounting block 50 is a small circular hole 57 which also communicates with the ball-receiving recess 52. Formed in the two side surfaces of the mounting block 50 opposite the corner in which the ball-receiving recess 52 is formed are two rectangular recesses 58 and and two further recessed shoulders 59.

Figure 8:
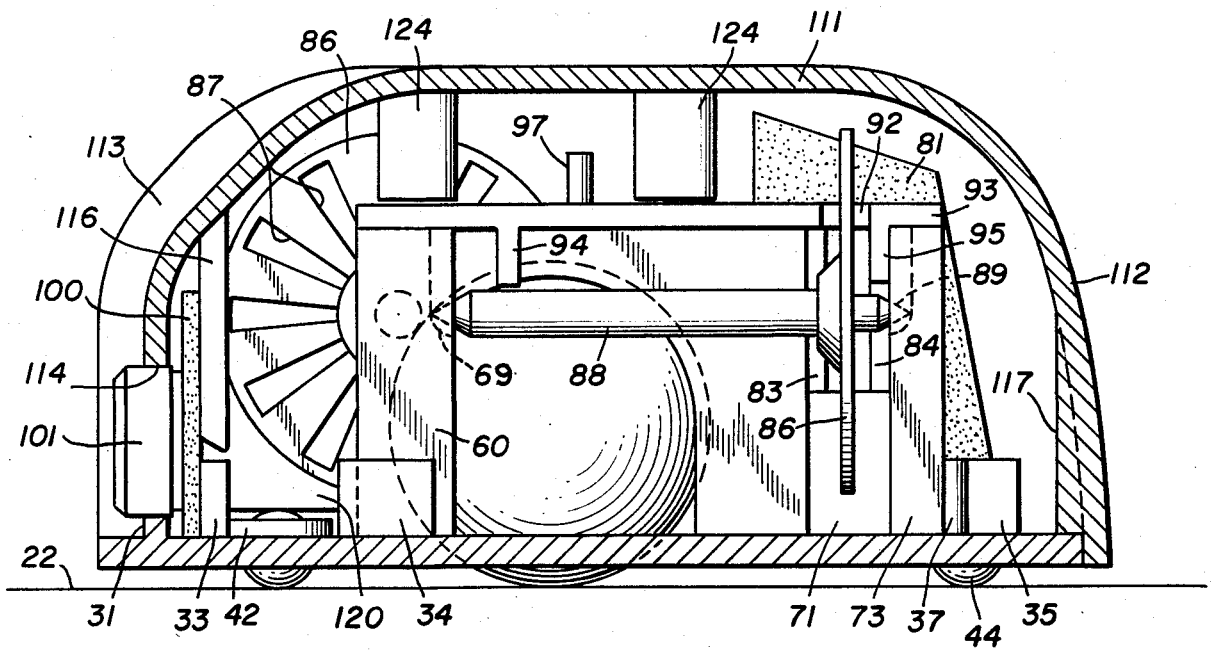
FIG. 8 is a view in vertical section taken along the line 8—8 in FIG. 5.
Figure 9:
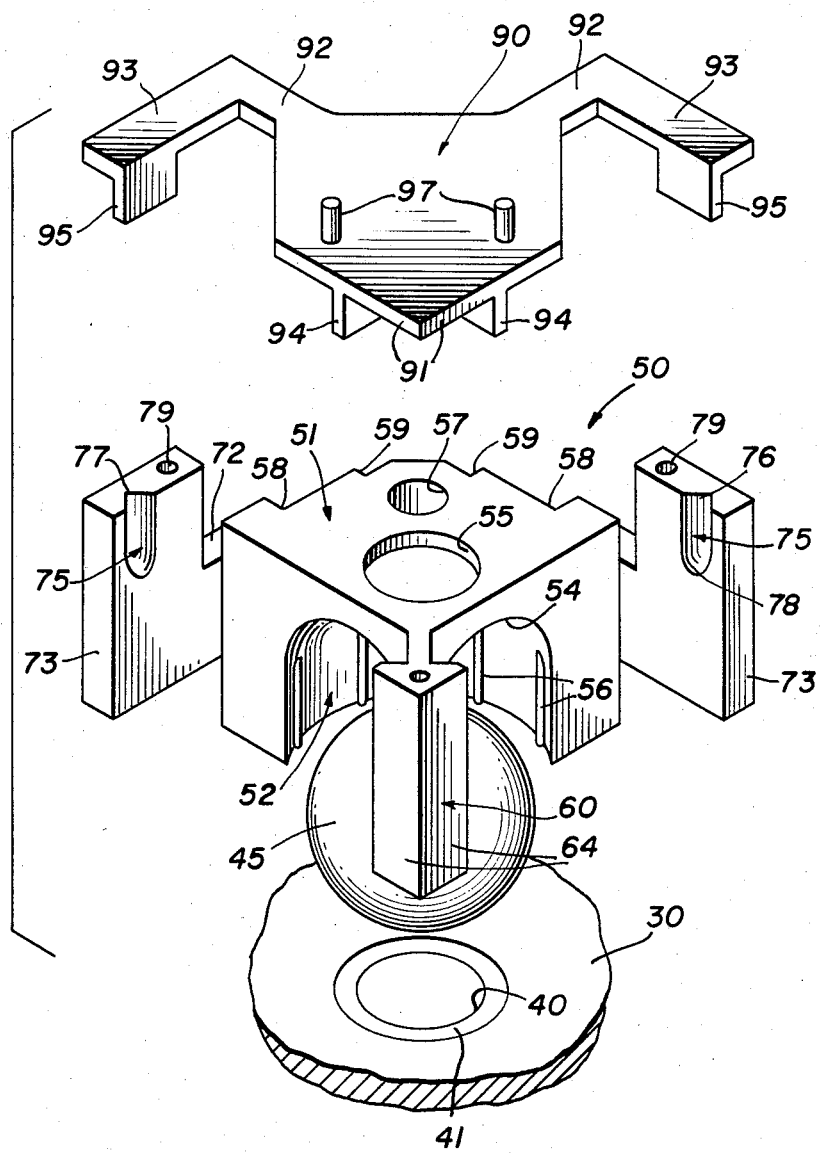
FIG. 9 is an exploded perspective view of the ball mounting frame of the present invention.
Figure 10:
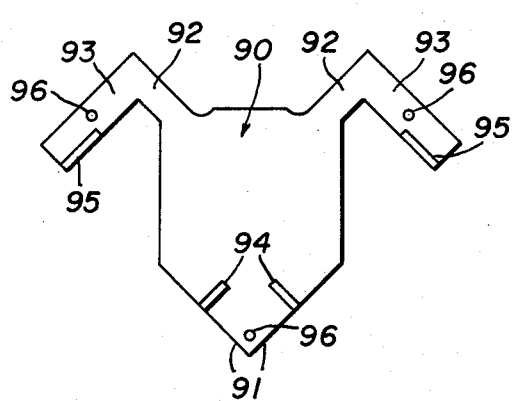
FIG. 10 is a reduced bottom plan view of the cap plate of the frame of FIG. 9.
Figure 11:
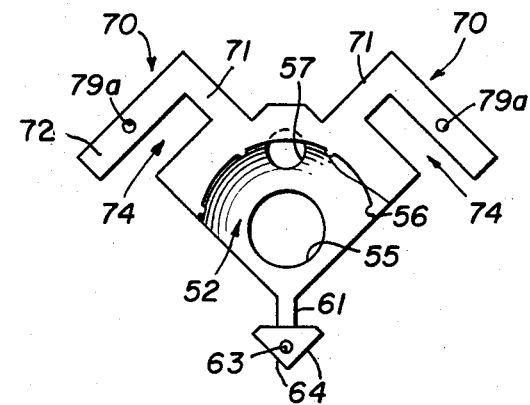
FIG. 11 is a reduced bottom plan view of the ball mounting block of FIG. 9.

A corner piece 60 is connected to the corner of the main body 51 in which the ball-receiving recess 52 is formed by an integral web 61, the corner piece 60 being provided with small cylindrical bores 62 and 63, respectively in the top and bottom surfaces thereof (see FIGS. 9 and 11). The corner piece 60 has two rectangular outer retaining surfaces 64 which join at a 90° corner. Formed in the inner surfaces of the corner piece 60 which face the main body 51 are two generally V-shaped vertical bearing grooves 65 which extend downwardly from the top of the corner piece 60, each of the bearing grooves 65 being defined by a surface 66 on the web 61 and a surface 67 on the corner piece 60, the surfaces 66 and 67 meeting at an apex 68 (see FIG. 5). The lower end of each of the bearing grooves 65 has a generally part-spherical concave surface 69 (FIG. 8).

Also integral with the main body 51 and projecting respectively from the two side surfaces thereof opposite the ball-receiving recess 52 are two wings, each generally designated by the numeral 70 (FIG. 11), and formed substantially as mirror images of each other. Each of the wings 70 includes a short rectangular arm 71 which projects perpendicularly from the main body 51 and which is in turn integral at its outer end with an elongated flange 72 (FIGS. 9 and 11) which extends parallel to the adjacent side wall of the main body 51 and cooperates therewith to define therebetween a rectangular notch 74 (see FIG. 11). The arms 71 and the adjacent portions of the flanges 72 have a height approximately half that of the main body 51, while the distal ends of the flanges 72 have an enlarged bearing portion 73 which are substantially the same height as the main body 51 and which project forwardly therebeyond to points substantially coplanar with the adjacent ones of the retaining surfaces 64 on the corner piece 60.

Formed respectively in the bearing portions 73 at the upper ends thereof are two vertical, generally V-shaped bearing grooves 75, which are respectively substantially identical in shape to the bearing grooves 65. More specifically, each of the bearing grooves 75 has a pair of side surfaces 76 meeting at an apex 77, the lower end of each bearing groove 75 having a generally part-spherical concave surface 78. Each of the bearing portions 73 is also provided with cylindrical bores 79 and 79a respectively in the top and bottom surfaces thereof (see FIGS. 9 and 11).

Figure 4:
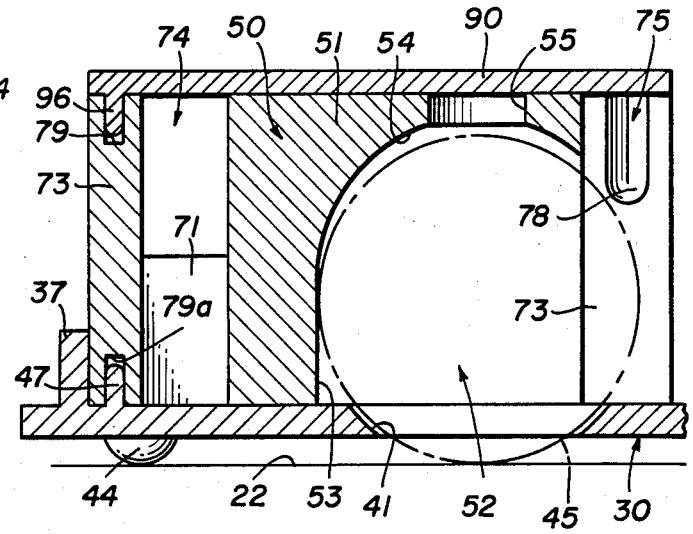
FIG. 4 is an enlarged fragmentary view in vertical section taken along the line 4—4 in FIG. 2, and illustrating the ball mounting block.
Figure 7:
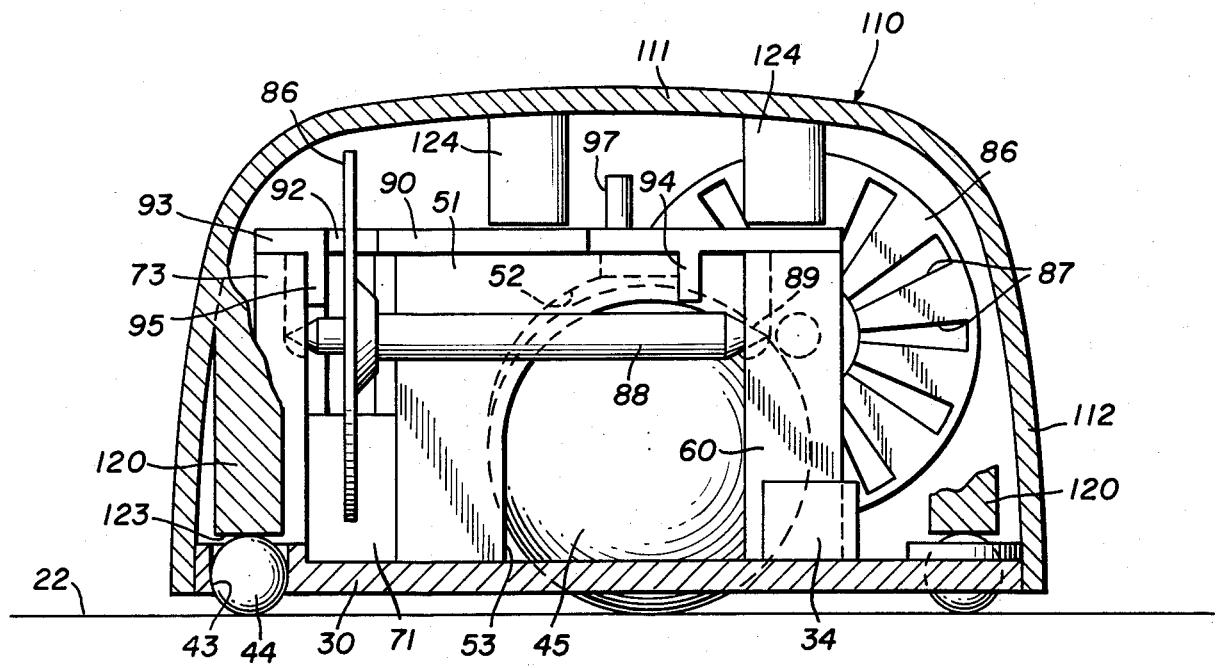
FIG. 7 is a view in vertical section taken along the line 7—7 in FIG. 5, with portions broken away more clearly to show the internal construction of the device.

In assembly, the control ball 45 is seated on the beveled surface 41 in the ball hole 40. The mounting block 50 is then placed over the control ball 45 in a mounted position, illustrated in FIGS. 3-5, 7 and 8. In this mounted position, the control ball 45 is received in the ball-receiving recess 52 and the positioning pins 47 are respectively press-fitted in the bores 63 and 79a, accurately to position the mounting block 50 on the base 30, with the retaining surfaces 64 of the corner piece 60 respectively disposed for engagement with the inner surfaces of the angle lug 34 and with the outer surfaces of the flanges 72 respectively disposed for engagement with the positioning flanges 37, thereby effectively to retain the mounting block 50 in place and prevent horizontal movement thereof. It will be noted that in this mounted position, the arms 71 of the mounting block 50 are respectively disposed parallel to the retaining flanges 38 and spaced a slight distance therefrom. As is best illustrated in FIGS. 4, 7 and 8, when the mounting block 50 is disposed in its mounted position, the control ball 45 is loosely retained in the ball-receiving recess 52 so as to be freely universally rotatable in response to frictional engagement of the control ball 45 with the support surface 22. In this regard, the surface of the control ball 45 engages only the bearing ribs 56 so as to minimize frictional resistance to rotation. The control ball 45 has a diameter such that it projects outwardly from the open sides of the ball-receiving recess 52.

Referring now in particular to FIGS. 2, 5, 7 and 8, the mouse 20 includes two direction control assemblies, each generally designated by the numeral 80, which are constructed and arranged substantially as mirror images of each other so that only one will be described in detail. Each of the direction control assemblies 80 includes a printed circuit board 81 which is arranged to fit in a vertical orientation snugly in the space between the corresponding one of the arms 71 and its associated retaining flange 38. One of the circuit boards 81 has its outer side edge retained in the U-shaped lug 35, while the other circuit board 81 has its outer edge retained between the short lugs 36. Mounted on each of the circuit boards 81 are circuit elements (not shown) and an optical block 82. As can best be seen in FIG. 5, the optical block 82 is generally U-shaped, having arms 83 and 84 which project generally perpendicular to the circuit board 81 and are separated by a rectangular notch 85. The optical block 82 is positioned on the circuit board 81 so that when the circuit board 81 is mounted in place, the optical block 82 rests on the arm 71 and flange 72 of the associated wing 70, with the distal ends of the arms 83 and 84 being respectively retained against the associated bearing portion 73 and recess 58, thereby effectively to prevent horizontal movement of the optical block 82.

The notch 85 communicates with the associated notch 74 of the mounting block 50 and cooperates therewith for receiving a vertically disposed code wheel 86 having a plurality of equiangularly spaced-apart slots 87 formed therethrough (see FIGS. 7 and 8). The code wheel 86 is fixedly secured to an elongated shaft 88 have conically pointed journal tips 89 at the ends thereof respectively disposed in the associated bearing grooves 65 and 75. The apex angle of the journal tips 89 is less than the angle formed by the side surfaces of each of the bearing grooves 65 and 75, and the axial distance between the journal tips 89 is very slightly less than the distance between the apices 68 and 7 of the bearing grooves 65 and 75. Thus, when the shaft 88 is dropped into place in the bearing grooves 65 and 75, one of the journal tips 89 makes essentially point contact at the intersection of the groove apex 68 with the part-spherical concave surface 69, while the other journal tip 89 makes essentially point contact at the intersection between the groove apex 77 with the part-spherical concave surface 78.

When thus mounted in position, the shaft 88 is disposed for frictional engagement with a portion of the control ball 45 which projects laterally from the ball-receiving recess 52, and with the longitudinal axis of the shaft 88 parallel to a corresponding one of the orthogonal axes 27 and 28. Thus, it will be appreciated that a component of rotation of the control ball 45 about an axis parallel to one of the axes 27 and 28 can effect rotation of the corresponding shaft 88 and code wheel 86.

The arms 83 and 84 of the optical block 82 respectively carry a light source, such as a light-emitting diode (LED), and a light-responsive element, such as a photodiode. The slots 87 in the code wheel 86 are positioned to pass the light beam between the LED and the photodiode, this beam being intermittently interrupted as a result of rotation of the code wheel 86 for generating output signals indicative of the speed of rotation of the control ball 45 about an axis parallel to a correspondin9 one of the ortho9onal axes 27 and 28, all in a known manner.

Referring now to FIGS. 2 and 7-10, there is also provided a cap plate 90 adapted to overlie the mounting block 50 for retaining the optical blocks 82 and the shafts 88 in place on the mounting block 50. The cap plate 90 is preferably of unitary one-piece construction, and may be molded of a suitable plastic material. The cap plate 90 is generally in the shape of a rectangle with two adjacent corners truncated to define tapered edges 91. Extending respectively from the other corners of the cap plate 90 are two arms 92, each provided at the distal end thereof with an elongated extension 93, the upper and lower surfaces of the cap plate 90, the arms 92 and the extensions 93 being substantially coplanar. Depending from the cap plate 90 integral therewith and substantially perpendicular thereto are two rectangular retaining flanges 94, respectively disposed substantially perpendicular to the tapered edges 91. Respectively depending from the extensions 93 integral therewith and perpendicular thereto, and respectively parallel to the retaining flanges 94, are two retaining flanges 95. Three positioning pins 96 (FIG. 10) depend from the cap plate 90, respectively along the extensions 93 and adjacent to the intersection of the tapered edges 91. The cap plate 90 is also provided with two integral upstanding posts 97.

In use, the cap plate 90 is mounted in a retaining position on top of the mounting block 50, with the pins 96 respectively press-fitted into the bores 63 and 79, accurately to position the cap plate 90. In this retaining position, the arms 92 and the extensions 93 overlie the optical blocks 82 and cooperate with the arms 71 and flanges 72 of the mounting block 50 for preventing vertical movement of the optical blocks 82. Also, the lower edges of the retaining flanges 94 and 95 are spaced a slight distance above the shafts 88 for limiting upward vertical movement of the shafts 88. More specifically, as is best illustrated in FIGS. 7 and 8, each shaft 88 is retained in place by one retaining flange 94 and one retaining flange 95, which are respectively disposed adjacent to opposite ends of the shaft 88 and on opposite sides of the code wheel 86. Thus, it will be appreciated that the mounting block 50 and the cap plate 90 cooperate to form a frame for mounting the control ball 45 and the direction control assemblies 80 in place in the housing 21.

Figure 2:
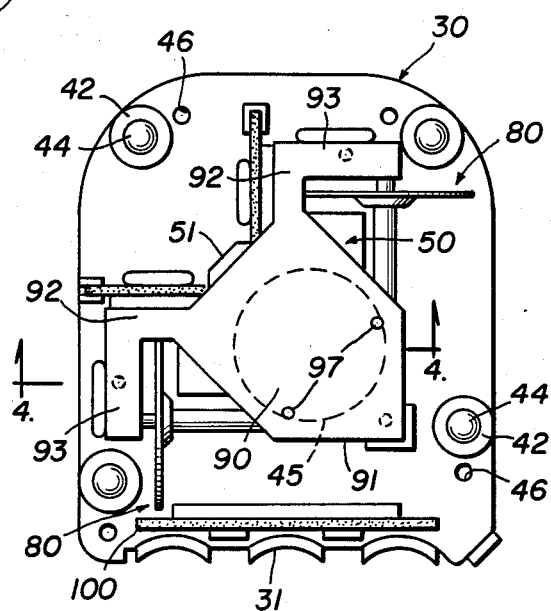
FIG. 2 is a view similar to FIG. 1, with the mouse rotated 180° and with the cover removed, to illustrate the internal construction.
Figure 3:
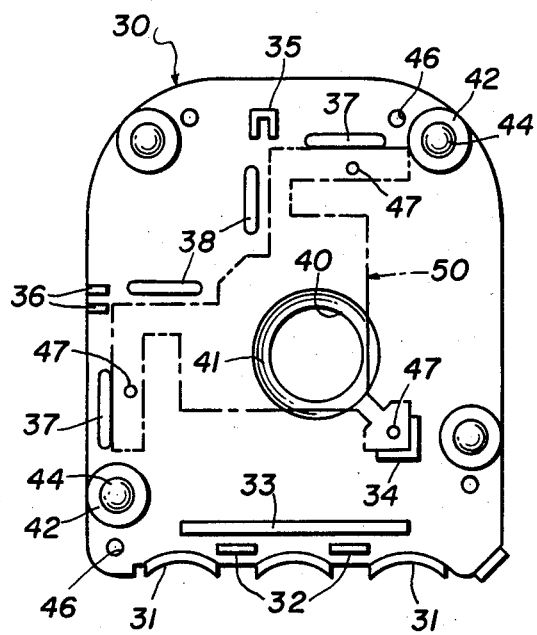
FIG. 3 is a top plan view of the base of the mouse of FIG. 2.

Referring to FIGS. 2 and 8, there is also provided a printed circuit board 100 which is adapted to have the lower edge thereof frictionally fitted between the lugs 32 and the retaining bar 33 on the base 30 for holding the board 100 in place in a vertical orientation. Mounted on the board 100 and projecting forwarding therefrom are three pushbutton switches 101 which respectively overlie the arcuate finger rests 31 of the base 30. The switches 101 can be utilized to control any desired functions, and it will be appreciated that the switches 101 are connected by suitable wiring (not shown) to the control cable 25 and to the circuit boards 81.

Referring now in particular to FIGS. 1 and 5-8, the cover 110 is generally in the shape of an open-bottom rectangular cup having a top wall 111 and a peripheral generally rectangular side wall 112. The cover 110 is preferably of unitary one-piece construction and may be molded of a suitable plastic material. The front portion of the peripheral wall 112 has a scalloped configuration, defining three finger recesses 113. Formed in the bottom edge of this scalloped wall portion are three rectangular cutouts 114 for respectively accommodating the pushbutton switches 101. One of the front corners of the cover 110 may be provided with a recess (not shown) for accommodating the control cable 25.

Integral with the top wall 111 and depending therefrom are two retaining members 116 (one shown in FIG. 8) which cooperate with the front portion of the peripheral wall 112 to trap therebetween the upper edge of the printed circuit board 100 when the cover 110 is mounted in place on the base 30. Also integral with the peripheral wall 112, respectively along the rear and side portions thereof, are positioning lugs 117 (one shown in FIG. 8). Integral with the top wall 111 and depending therefrom respectively adjacent to the corners thereof are four mounting posts 120, each provided at the lower end thereof with a threaded hole 121. When the cover 110 is mounted in place on the base 30, the holes 121 respectively align with the mounting apertures 46 for receiving suitable fasteners such as screws 122 (FIG. 6), securely to hold the base 30 and the cover 110 together. The lower end of each of the mounting posts 120 is also provided with a recessed bearing surface 123 which is disposed for overlying a corresponding one of the bushings 42 a slight distance thereabove for limiting upward movement of the balls 44. Finally, four retaining lugs 124 depend from the top wall 111 and are disposed for engagement with the cap plate 90, thereby to cooperate with the base 30 securely to retain the cap plate 90 in place in its retaining position and thereby retain the mounting block 50 in its mounted position.

In assembly, the cover 110 is fitted over the base 30 in surrounding relationship therewith, so that the base 30 is recessed within the peripheral wall 112, the upper surface of the base 30 engaging the lower ends of the positioning lugs 117 and the bottom surface of the base 30 being substantially flush with the bottom edge of the peripheral wall 112, as is best illustrated in FIGS. 7 and 8. The cover 110 is secured in place with the screws 122, the mounting posts 120 serving to retain the balls 44 in place and the retaining lugs 124 cooperating with the base 30 to retain the mounting block 50 in place, as described above.

Figure 6:
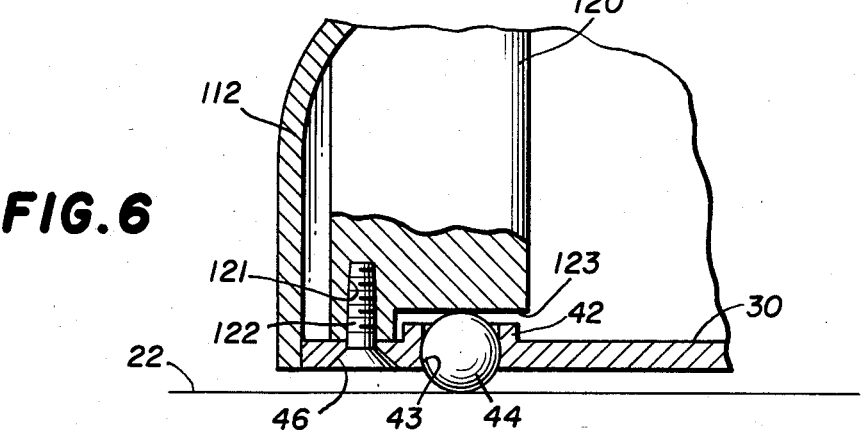
FIG. 6 is a fragmentary view in vertical section taken along the line 6—6 in FIG. 5.

In operation, when the assembled housing 21 is placed on the support surface 22, the balls 44 are pushed up slightly off the inturned lips 43 of the bushings 42 and into engagement with the bearing surfaces 123 of the mounting posts 120 (see FIG. 6). But the bearing surfaces 123 present minimal frictional resistance to rotation of the balls 44, because there is essentially point contact therebetween. When the housing 21 is thus supported on the balls 44, the control ball 45 is pushed a slight distance up off the beveled surface 41 of the ball hole 40 and into engagement with the shafts 88 and into position for engagement with the bearing ribs 56 in the ball-receiving recess 52 of the mounting block 50. Upward movement of the shafts 88 is limited by the retaining flanges 94 and 95 of the cap plate 90. The only frictional resistance to rotation of the control ball 45 within the mounting block 50 is offered by the bearing ribs 56 and the shafts 88. Thus, the control ball 45, and the direction control assemblies 80 are effectively retained in place in the housing 21 by a very simple construction which requires no fasteners, and which still accommodates universal rotation of the control ball 45 and rotation of the shafts 88 with very low friction.

The user places his hand over the housing 21, with his palm on the top wall 111 and with his index, middle and ring fingers respectively disposed in the finger recesses 113 and in engagement with the pushbutton switches 101 for operation thereof. The user then rolls the housing 21 along the support surface 22 in standard fashion, this movement effecting a corresponding rotation of the control ball 45, which in turn rotates the shafts 88 of the direction control assemblies 80 for transmitting speed and direction signals over the control cable 25.

From the foregoing, it can be seen that there has been provided an improved mouse-type position indicating control apparatus which is of simple and inexpensive construction, and which affords a unique assembly for retaining the control ball 45 and the direction control assemblies 80 in position without the use of fasteners, while accommodating rotation thereof with minimum friction. Assembly of the mouse 20 is extremely simple, requiring only four screws to attach the base to the cover.

I claim:

1. Position indicating control apparatus for electronically representing position and movement along a support surface, said apparatus comprising: a housing having an apertured base member, spherical means for supporting said housing on the support surface and transporting said housing over the support surface, frame means discrete from and disposed entirely within said housing and defining a recess receiving said spherical means therein, means for mounting said frame means substantially immovably with respect to said housing, said frame means cooperating with said base for loosely encompassing said spherical means and constraining it in a mounted condition in said housing, said spherical means in its mounted condition being universally rotatable and having a portion thereof extending through said aperture in said base member so that contact between said spherical means and the support surface provides rotation of said spherical means indicative of movement of said housing with respect to the support surface, and transducer means coupled to said spherical means and responsive to rotation thereof for producing electrical signals indicative of the movement and position of said housing.

2. The position indicating control apparatus of claim 1, wherein said frame means includes a unitary one-piece block having a part-spherical recess therein for accomodating said spherical means.

3. The position indicating control apparatus of claim 2, wherein said block is formed of a self-lubricating plastic.

4. The position indicating control apparatus of claim 2, wherein said block includes extension means unitary therewith and extending therefrom for supporting said transducer means.

5. The position indicating control apparatus of claim 4, wherein said frame means further includes means cooperating with said extension means securely to hold said transducer means in place thereon.

6. The position indicating control apparatus of claim 1, and further including positioning means on said base member engageable with said frame means accurately to position said frame means on said base member with respect to the aperture therein.

7. The position indicating control apparatus of claim 1, wherein said housing includes a cover member cooperating with said base member to form an enclosure, said retaining means being carried by said cover member.

8. Position indicating control apparatus for electronically representing position and movement along a support surface, said apparatus comprising: a housing having an apertured base member, spherical means for supporting said housing on the support surface and transporting said housing over the support surface, frame means discrete from and disposed entirely within said housing and defining a recess receiving said spherical means therein, means for mounting said frame means substantially immovably with respect to said housing, said frame means cooperating with said base for loosely encompassing said spherical means and constraining it in a mounted condition in said housing, said spherical means in its mounted condition being universally rotatable and having a portion thereof extending through said aperture in said base member so that contact between said spherical means and the support surface provides rotation of said spherical means indicative of movement of said housing with respect to the support surface, and a pair of rotatable members supported by said frame means for rotation respectively about orthogonal axes, each of said rotatable members being frictionally coupled with said spherical means such that each of said rotatable members rotates as a function of one of two orthogonal components of the rotation of said spherical means, and transducer means responsive to rotation of each of said rotatable members for delivering signals indicative of the movement and position of said housing.

9. The position indicating control apparatus of claim 8, wherein said frame means has a plurality of bearing grooves therein defining bearing surfaces, each of said rotatable members including an elongated shaft having journals at the opposite ends thereof respectively receivable in said bearing grooves for engaging the associated bearing surfaces, the configuration of said journals and said bearing surfaces being such as to cause each journal to make substantially point contact with its associated bearing surface.

10. The position indicating control apparatus of claim 8, wherein said frame means includes a mounting member having a plurality of bearing grooves therein defining bearing surfaces, each of said rotatable members including an elongated shaft having journals at the opposite ends thereof respectively receivable in said bearing grooves for engaging the associated bearing surfaces, said frame means further including holding means cooperating with said mounting member for holding said shafts in said bearing grooves while accommodating rotation of said shafts.

11. The position indicating control apparatus of claim 10, wherein said mounting member includes extension means for supporting said transducer means, said holding means cooperating with said extension means securely to hold said transducer means in place thereon.

12. The position indicating control apparatus of claim 10, wherein said mounting member has apertures therein, and said holding means includes attachment members disposed for press-fitting engagement in said apertures frictionally and releasably to mount said holding means on said mounting member.

13. The position indicating control apparatus of claim 8, and further including printed circuit board means connected to said transducer means, said base member including retaining means for frictionally receiving and positioning said circuit board means and said transducer means with respect to said rotatable members.

14. Position indicating control apparatus for electronically representing position and movement along a support surface, said apparatus comprising: a housing having an apertured base and a cover cooperating to define an enclosure, spherical means for supporting said housing on the support surface and transporting said housing over the support surface, frame means discrete from and disposed entirely within said housing and defining a recess receiving said spherical means therein, said frame means cooperating with said base for loosely encompassing said spherical means and constraining it in a mounted condition in said housing, said spherical means in its mounted condition being universally rotatable and having a portion thereof extending through said aperture in said base so that contact between said spherical means and the support surface provides rotation of said spherical means indicative of movement of said housing with respect to the support surface, a pair of rotatable members supported by said frame means for rotation respectively about orthogonal axes, each of said rotatable members being frictionally coupled with said spherical means such that each of said rotatable members rotates as a function of one of two orthogonal components of the rotation of said spherical means, retaining means carried by said cover and cooperating with said base for securely holding said frame means substantially immovably therebetween, and transducer means responsive to rotation of each of said rotatable members for delivering signals indicative of the movement and position of said housing.

15. The position indicating control apparatus of claim 14, wherein said frame means includes a mounting block encompassing said spherical means and supporting said rotatable members, and a holding plate overlying said mounting block and adapted for press-fitted frictional engagement therewith for holding said rotatable members in place thereon, said retaining means being engageable with said holding plate.

16. The position indicating control apparatus of claim 14, wherein said base includes a relatively large aperture and a plurality of small apertures therethrough, said spherical means including a large ball rotatably encompassed by said frame means and extending through said large aperture and a plurality of small balls respectively having portions thereof extending through said small apertures for cooperation with said large ball to provide a level rolling support for said housing on the support surface.

17. The position indicating control apparatus of claim 16, wherein said base includes socket structures respectively surrounding said small apertures for positioning said small balls with respect to said small apertures, and bearing means carried by said cover for cooperation with said socket structures loosely to constrain said small balls in bearing positions while accommodating rotation thereof.

18. The position indicating control apparatus of claim 14, and further including a plurality of manually operable switches carried by said cover for controlling selected functions.

* * * * *